（12）United States Patent
Barshaw et al.

(10) Patent No.: US 12,397,847 B2
(45) Date of Patent: Aug. 26, 2025

(54) STEERING COLUMN MOUNT BRACKET RELEASE FEATURE

(71) Applicant: Steering Solutions IP Holding Corporation, Saginaw, MI (US)

(72) Inventors: Todd A. Barshaw, Bay City, MI (US); Michael P. Anspaugh, Bay City, MI (US); Randy W. Jones, North Branch, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/924,339

(22) Filed: Oct. 23, 2024

(65) Prior Publication Data

US 2025/0128755 A1    Apr. 24, 2025

Related U.S. Application Data

(60) Provisional application No. 63/545,512, filed on Oct. 24, 2023.

(51) Int. Cl.
*B62D 1/19* (2006.01)

(52) U.S. Cl.
CPC ................................ *B62D 1/195* (2013.01)

(58) Field of Classification Search
CPC ................................ B62D 1/195; B62D 1/197
See application file for complete search history.

(56) References Cited

U.S. PATENT DOCUMENTS

| 10,518,799 | B2 * | 12/2019 | Nagatani | B62D 1/185 |
| 2007/0228717 | A1 * | 10/2007 | Tanai | F16F 7/128 |
| | | | | 280/777 |
| 2008/0238070 | A1 * | 10/2008 | Bodtker | B62D 1/195 |
| | | | | 74/492 |

* cited by examiner

*Primary Examiner* — Jason D Shanske
*Assistant Examiner* — Matthew James O'Neill
(74) *Attorney, Agent, or Firm* — Dickinson Wright PLLC

(57) ABSTRACT

A steering column assembly has a mount bracket configured for attachment to a fixed vehicle support member in a releasably fixed position and for release from the fixed vehicle support member to a released position during a steering column energy absorbing event. A steering jacket is operably supported by the mount bracket. The steering jacket has at least one interface feature arranged to confront the mount bracket during the steering column energy absorbing event to inhibit rotational movement of the mount bracket relative to the steering jacket when the mount bracket moves from the fixed position to the released position.

20 Claims, 5 Drawing Sheets

STEERING COLUMN MOUNT BRACKET RELEASE FEATURE

CROSS-REFERENCE TO RELATED APPLICATION

This application claims the benefit of U.S. Provisional Application Ser. No. 63/545,512, filed Oct. 24, 2023, which is incorporated herein by reference in its entirety.

FIELD OF THE INVENTION

This disclosure generally relates to steering column assemblies and, more particularly, to steering column assemblies with releasable mount brackets.

BACKGROUND

Automotive steering column assemblies are known to include a mount bracket releasably attached to a vehicle frame member for intentional release during impact of a driver with a steering wheel. Smooth release of the mount bracket from the frame member is desired, without binding between the mount bracket and the vehicle frame member. Unfortunately, the mount bracket can become tilted relative to the vehicle frame member during release, thereby resulting in unwanted resistance and binding between the mount bracket and the vehicle frame member.

SUMMARY

In accordance with one aspect of the disclosure, a steering column assembly includes a mount bracket configured for attachment to a fixed vehicle support member in a releasably fixed position and for release from the fixed vehicle support member to a released position during a steering column energy absorbing event. A steering jacket is operably supported by the mount bracket. The steering jacket has at least one interface feature arranged to confront the mount bracket, during the steering column energy absorbing event, to inhibit rotational movement of the mount bracket relative to the steering jacket when the mount bracket moves from the fixed position to the released position.

In accordance with one aspect of the disclosure, a method of causing a steering jacket to inhibit rotation of a mount plate as the mount plate moves from a releasably fixed position with a fixed vehicle support member to a released position from the fixed vehicle support member during a steering column energy absorbing event, includes: providing the steering jacket having at least one interface feature extending toward the mount plate, with the at least one interface feature arranged to confront the mount plate during the steering column energy absorbing event to inhibit rotational movement of the mount plate relative to the steering jacket when the mount plate moves from the releasably fixed position to the released position.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the present disclosure will be described with reference to specific steering shaft assembly and clamp yoke embodiments. It is to be understood that the disclosed embodiments are merely illustrative of the present disclosure and may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
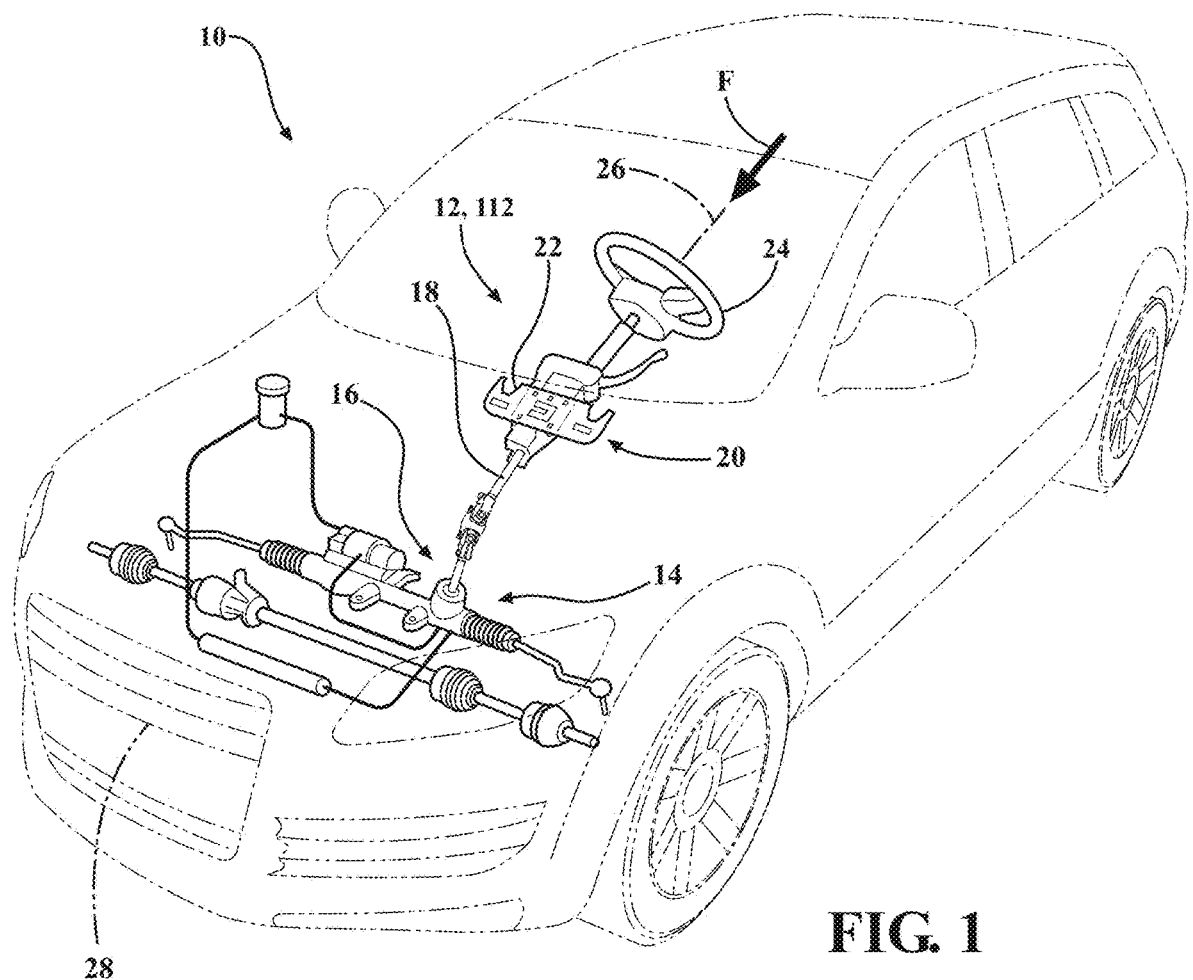
FIG. 1 is a perspective view of motor vehicle including a steering column assembly constructed in accordance with an aspect of the disclosure.

FIG. 1 illustrates a motor vehicle 10 having a steering column assembly 12 operably coupled to a steering gear assembly 14 by a steering shaft assembly, such as an intermediate shaft assembly, and referred to hereafter as intermediate shaft 16, constructed in accordance with an aspect of the disclosure. The steering column assembly 12 has a steering jacket assembly including one or more coaxially aligned steering jackets, with an upper steering jacket 18 shown supported by a mount bracket 20. The mount bracket 20 is configured for attachment to a fixed vehicle support member 22, such as vehicle frame member, by way of example and without limitation, in a releasably fixed position, such as via energy absorption straps 23. The mount bracket 20 is configured for release from the fixed vehicle support member 22, whereupon mount bracket 20 translates in sliding relation along energy absorption straps 23 with the upper steering jacket 18, and in accordance with the disclosure, the mount bracket 20 translates without rotation relative to the upper steering jacket 18, or at least without substantial rotation (meaning that the mount bracket, if it rotates at all, only rotates along the direction of arrow A between about 0.1-5 degrees, and more preferably less than 3 degrees), to a released position during a steering column energy absorbing event. The minimal relative rotation between the upper steering jacket 18 and mount bracket 20 facilitates smooth sliding translation of the mount bracket 20 and upper steering jacket 18 relative to the energy absorption straps 23, without binding of the mount bracket 20, thereby absorbing energy and minimizing potential harm to the driver. The energy absorbing even can occur during a crash condition, whereupon a driver of the motor vehicle 10 may impact a steering wheel 24 of the steering column assembly 12, thereby causing an impact force F, acting generally along a longitudinal axis 26 of the steering column assembly 12, to move the upper steering jacket 18 axially, generally along the longitudinal axis 26, toward a front end 28 of the motor vehicle 10.

The mount bracket 20 of the steering column assembly 10 is a rake type mount bracket, wherein actuation of a lever 30 supported by a bolt 32 releases steering column assembly 12 for tilting movement, as desired by the driver. The driver, upon orienting the steering column assembly 12 in the desired inclined orientation, locks the steering column assembly 12 in place via lever 30. Mount bracket 20 includes a pair of release capsule slots, referred to hereafter as release slots 31.

During a steering column energy absorbing event, such as an impact force against the front end 28 of motor vehicle 10, by way of example and without limitation, force F is transmitted from a compression bracket 34, which is fixed to upper steering jacket 18, through the bolt 32 to the mount bracket 20. Release slots 31 of mount bracket 20 are then caused to separate from vehicle support member 22, whereupon mount bracket 20 slides smoothly, without tipping, also referred to as rotation, along energy absorption straps 23.

Figure 3:
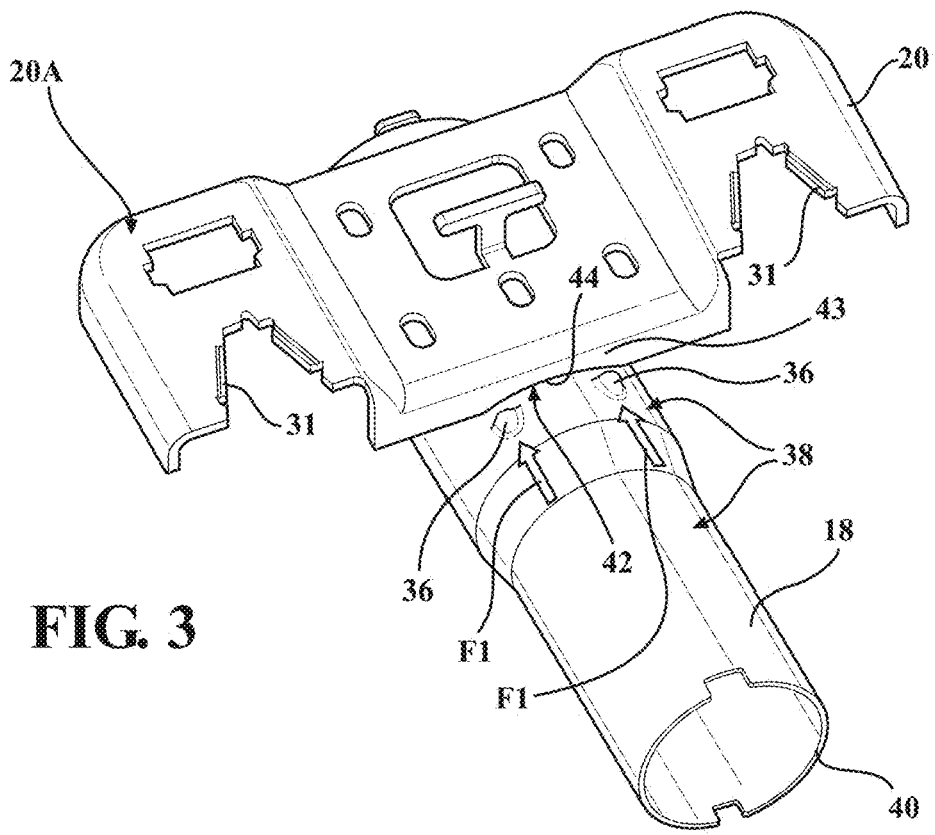
FIG. 3 is a view similar to FIG. 2A with various components removed for clarity purposes of illustrating the interface feature on the steering column jacket constructed in accordance with one aspect of the disclosure.

As mount bracket 20 separates from vehicle support member 22 and begins sliding along energy absorption straps 23, smooth, generally planar movement, intended to mean that an upper planar surface 20a of mount bracket 20 translates along and without tipping or without substantial tipping (minimal tipping, such as less than 3 degrees) relative to a plane P is promoted. Plane P is defined being parallel or substantially parallel (intended to mean within 5 degrees or less of true parallel) to the upper planar surface 20a of mount bracket 20 and parallel or substantially parallel (intended to mean within 5 degrees or less of true parallel) to longitudinal axis A. As such, smooth, non-binding movement of mount plate 20 along energy absorption straps 23 is facilitated via at least one stabilizing feature, also referred to as interface feature 36, arranged to confront the mount bracket 20, during the steering column energy absorbing event, to inhibit rotational movement of mount bracket 20 relative to the steering jacket 18 as the mount bracket 20 moves from the fixed position to the released position. As such, reaction loading (binding friction) between mount bracket 20 and release slots 31 is minimized, and thus, the mount bracket 20 is free to release from release slots 31 under the energy absorbing event, such that mount bracket 20 is prevented from deforming and the movement of mount bracket 20 is controlled, as intended, by the energy absorption straps 23, thereby controlling the energy load profile. As best shown in a non-limiting embodiment of FIG. 3, interface feature 36 is provided as a plurality of interface features 36 fixed to upper steering jacket 18. The interface features 36 are formed as a monolithic piece of the material of upper steering jacket 18, and can be formed as plastically deformed material of the upper steering jacket 18, such as in a mechanical material upsetting operation, including stamping, by way of example and without limitation. As such, no additional material is needed in addition to the material of upper steering jacket 18 to form the interface features 36.

Figure 2:
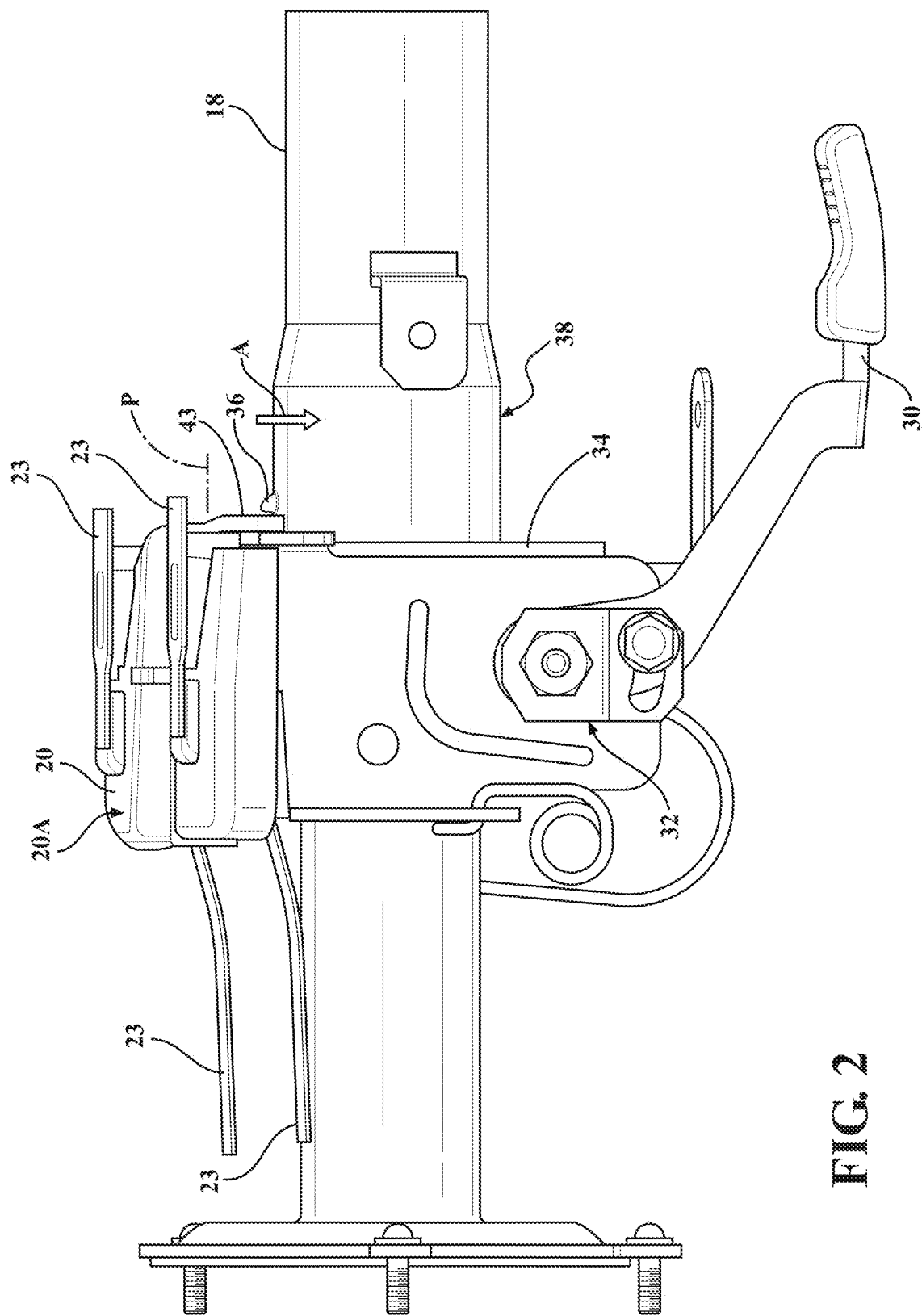
FIG. 2 is a fragmentary side view of the steering column assembly of FIG. 1.
Figure 2A:
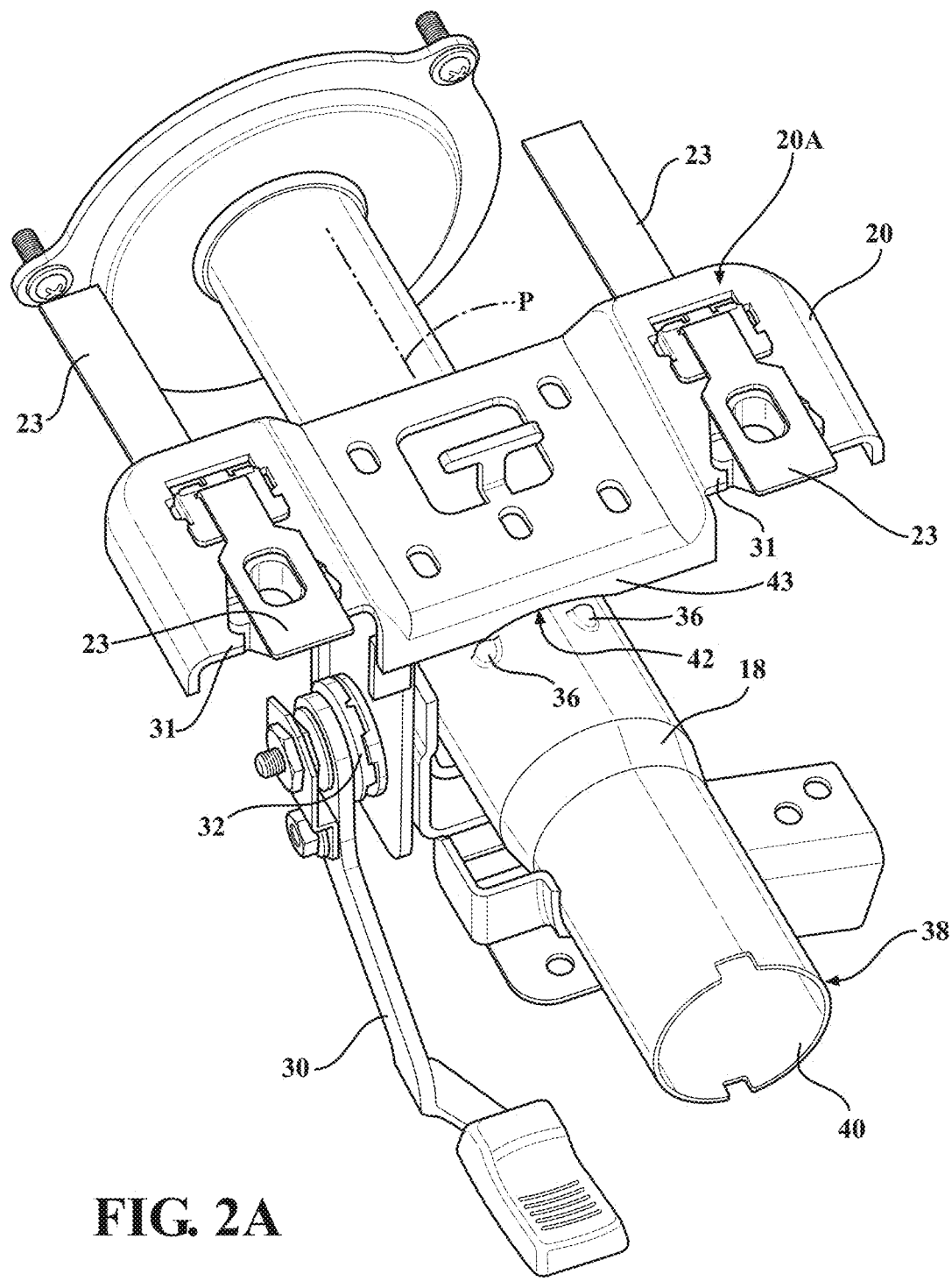
FIG. 2A is a perspective view of the steering column assembly of FIG. 2.
Figure 2B:
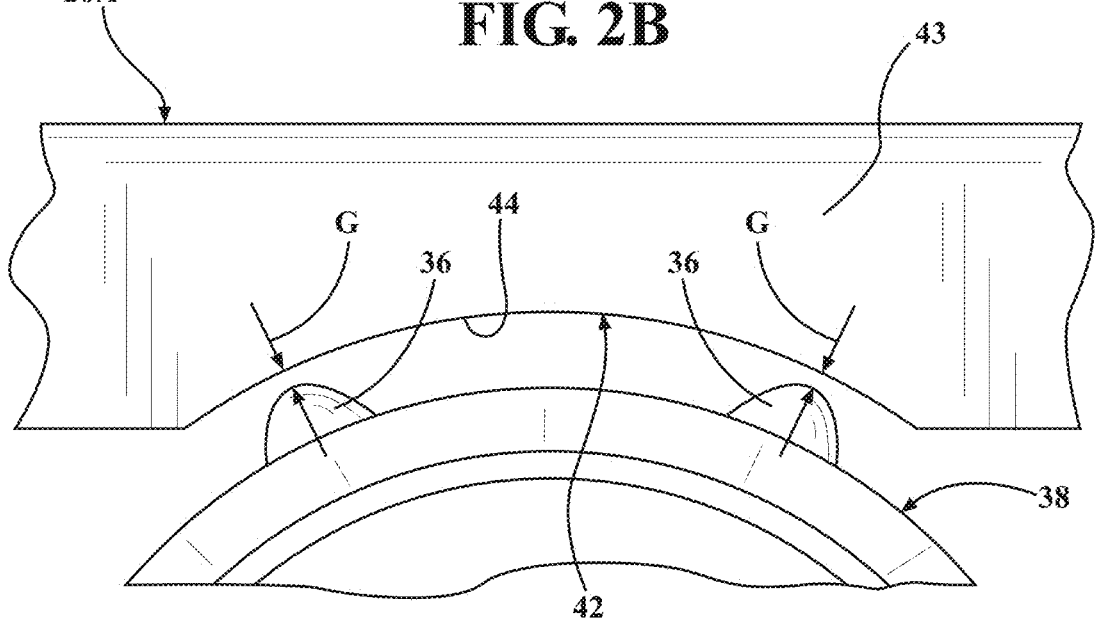
FIG. 2B is a fragmentary view looking generally along a longitudinal axis of the steering column assembly toward a mount bracket of the steering column assembly shown spaced by a gap from an interface feature of a steering column jacket of the steering column assembly prior to an energy absorbing event.
Figure 2C:
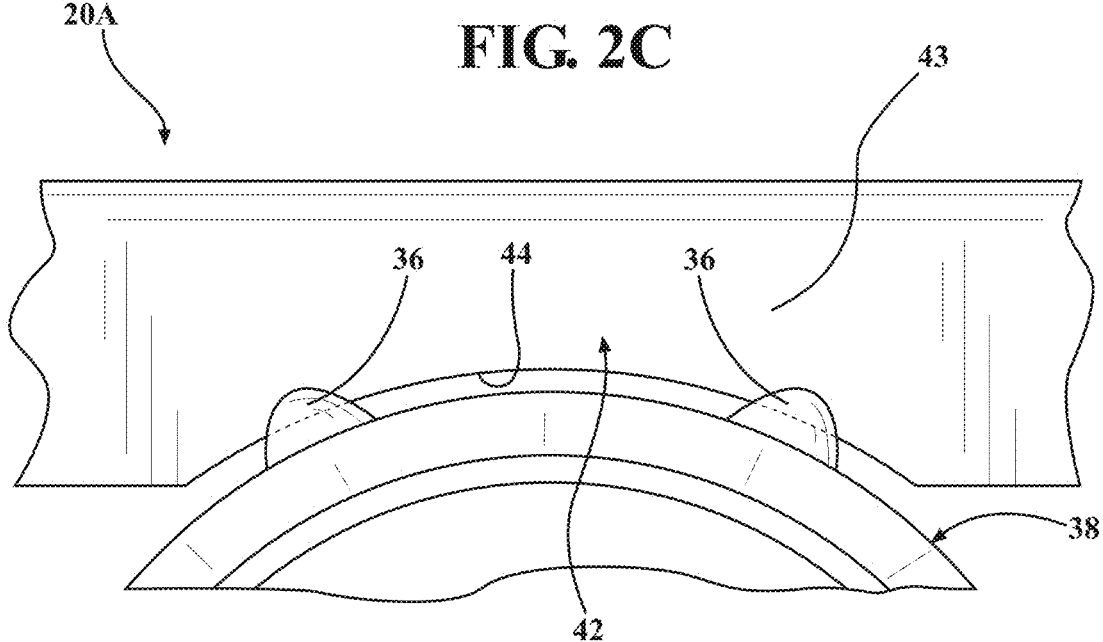
FIG. 2C is a view similar to FIG. 2B illustrating the steering column assembly during an energy absorbing event with the interface feature inhibiting rotation of the mount bracket in accordance with the disclosure.

Interface features 36 extend radially outwardly from an outer surface of the upper steering jacket 18. In the non-limiting embodiment illustrated, the interface features 36 extend radially outwardly from an outer surface 38, such as a generally straight cylindrical outer surface 38 of upper steering jacket 18, by way of example and without limitation, toward the mount bracket 20, with generally intended to mean that the outer surface 38 can be purely straight and purely cylindrical, or slightly less than straight, such as up to about 3 degrees off purely straight, and slightly out of cylindrical contour, such as being non-cylindrical in visual appearance. Accordingly, the interface feature(s) 36 reduce the distance (width) of a gap G (FIG. 2B, looking generally from the steering wheel 24 toward the mount bracket 20 along the longitudinal axis 26) extending between the upper steering jacket 18 and the mount bracket 20, and in particular, between a peak of the interface feature(s) 36 and a bottom surface of the mount bracket 20. Interface features 36 are shown spaced circumferentially from one another, and are equidistantly spaced from an end 40 of the upper steering jacket 18. Accordingly, as upper steering jacket 18 is moved generally along longitudinal axis 26 in an energy absorbing event (from right to left as viewed in FIG. 2), interface features 36 confront and engage a rearwardly facing surface 43 of mount bracket 20, such as extending upwardly from the bottom surface 42 of mount bracket 20, thereby causing mount bracket 20 and upper steering jacket to move conjointly and simultaneously with one another. The bottom surface 42 is shown as having a radiused scalloped region, referred to hereafter as scallop 44, contoured to provide clearance of the upper steering jacket 18 with mount bracket 20 in a rake up (uppermost adjustment of steering column assembly 12 during normal use) position of steering column assembly 12. The interface features 36 are arranged and aligned to confront and abut surface 43 adjacent the region of radiused scallop 44 during the energy absorbing event (FIG. 2C), thereby causing mount bracket 20 to translate along plane P with upper steering jacket 18. As such, the extent to which the interface features 36 need to extend outwardly from the outer surface 38 of upper steering jacket 18 to engage surface 43 is minimized, such as between about 1-5 mm, and more preferably between about 1-3 mm.

With interface features engaging surface 43 of mount bracket 20 during an energy absorbing event, the force transmitted to mount bracket 20 via bolt 32 is counteracted by a Force F1 imparted by interface features 42 against the surface 43, and thus, mount bracket 20 is inhibited from rotational movement downwardly relative to upper steering jacket 18 and vehicle support member 22. It is contemplated that a very small degree of rotational movement of mount bracket 20 may occur, such as between about 1-5 degrees at most, and preferably less than 3 degrees. Accordingly, movement of mount bracket 20 during the energy absorbing event may be in pure translation with no rotation, or in substantial translation with upper steering jacket 18 without a high degree of rotation, as discussed above.

Figure 4:
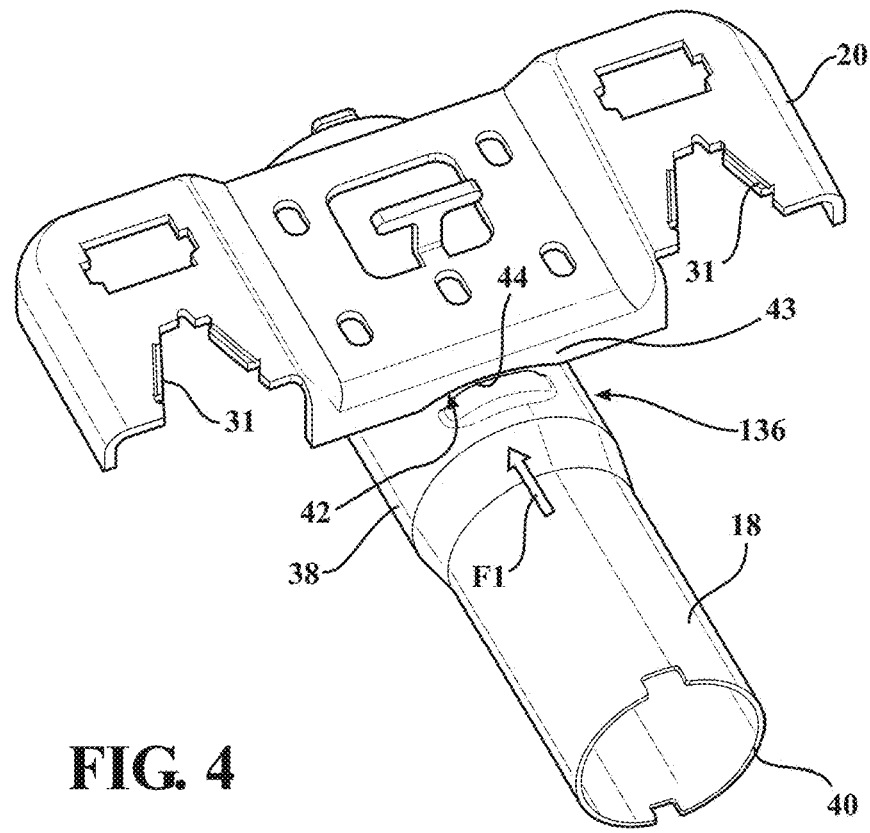
FIG. 4 is a view similar to FIG. 3 illustrating an interface feature on a steering column jacket constructed in accordance with another aspect of the disclosure.

As shown in another non-limiting embodiment of FIG. 4, a steering column assembly 112 is shown having an interface feature 136 constructed in accordance with another aspect of the disclosure. The interface feature 136 functions as discussed above for interface features 36, but rather than being formed as a plurality of interface features spaced from one another, interface feature 136 is formed as a single interface feature. Interface feature 136 is shown as extending along a circumferential direction of the cylindrical surface cylindrical outer surface 38 of upper steering jacket 18 along a substantial length, or the entirety of the length of scallop 44, thereby providing maximum resistance to rotation of the mount bracket 20 upon forcibly impacting the surface 43 during an energy absorption event.

In accordance with another aspect of the disclosure, a method of causing a steering jacket 18 to inhibit rotation of a mount bracket, also referred to as mount plate 20, as the mount plate 20 moves from a releasably fixed position with a fixed vehicle support member 22 to a released position from the fixed vehicle support member 22 during a steering column energy absorbing event, is provided. The method includes, providing the steering jacket 18 having at least one interface feature 36 extending toward the mount plate 20, with the at least one interface feature 36 arranged to confront the mount plate 20 during the steering column energy absorbing event to inhibit rotational movement of the mount plate 20 relative to the steering jacket 18 when the mount plate 20 moves from the releasably fixed position to the released position.

The method can further include providing the at least one interface feature 36 as a monolithic piece of material with the steering jacket 18.

The method can further include providing the at least one interface feature as a plurality of interface features 36, and further yet, providing the plurality of interface features 36 in circumferentially spaced from one another about an outer surface 38 of the steering jacket 18. Further, the method can include providing the plurality of interface features 36 in equidistantly spaced relation from an end 40 of the steering jacket 18.

The method can further include providing the at least one interface feature as a single interface feature 36, and further, providing the single interface feature 36 as a plastically deformed material of the steering jacket 18, with the interface feature 36 extending radially outwardly from a generally cylindrical outer surface 38 of the steering jacket 18.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A steering column assembly, comprising:
a mount bracket configured for attachment in a releasably fixed position to a fixed vehicle support member and for release from the fixed vehicle support member to a released position during a steering column energy absorbing event; and
a steering jacket operably supported by said mount bracket, said steering jacket having at least one interface feature arranged to confront said mount bracket, during the steering column energy absorbing event, to inhibit rotational movement of said mount bracket relative to said steering jacket when said mount bracket moves from the releasably fixed position to the released position.

2. The steering column assembly of claim 1, wherein said at least one interface feature is a monolithic piece of material of said steering jacket.

3. The steering column assembly of claim 2, wherein said at least one interface feature is plastically deformed material of said steering jacket.

4. The steering column assembly of claim 1, wherein said at least one interface feature extends radially outwardly from a generally cylindrical outer surface of said steering jacket toward said mount bracket.

5. The steering column assembly of claim 1, wherein said at least one interface feature includes a plurality of interface features.

6. The steering column assembly of claim 5, wherein said plurality of interface features are circumferentially spaced from one another.

7. The steering column assembly of claim 6, wherein said plurality of interface features are equidistantly spaced from an end of said steering jacket.

8. The steering column assembly of claim 1, wherein said at least one interface feature is a single interface feature.

9. The steering column assembly of claim 8, wherein said interface feature extends radially outwardly from a generally cylindrical outer surface of said steering jacket toward said mount bracket.

10. The steering column assembly of claim 9, wherein said interface feature extends in a circumferential direction about a portion of said generally cylindrical surface.

11. The steering column assembly of claim 1, wherein said at least one interface feature is configured to engage an outer peripheral edge of said mount bracket.

12. The steering column assembly of claim 1, wherein said mount bracket is a rake bracket.

13. A method of causing a steering jacket to inhibit rotation of a mount plate as the mount plate moves from a releasably fixed position with a fixed vehicle support member to a released position from the fixed vehicle support member during a steering column energy absorbing event, comprising:
providing the steering jacket having at least one interface feature extending toward the mount plate, with the at least one interface feature arranged to confront the mount plate during the steering column energy absorbing event to inhibit rotational movement of the mount plate relative to the steering jacket when the mount plate moves from the releasably fixed position to the released position.

14. The method of claim 13, further including providing the at least one interface feature as a monolithic piece of material with the steering jacket.

15. The method of claim 13, further including providing the at least one interface feature as a plurality of interface features.

16. The method of claim 15, further including providing the plurality of interface features in circumferentially spaced relation from one another about an outer surface of the steering jacket.

17. The method of claim 16, further including providing the plurality of interface features in equidistantly spaced relation from an end of the steering jacket.

18. The method of claim 15, further including providing the plurality of interface features from plastically deformed material of the steering jacket, with the plurality of interface features extending radially outwardly from a generally cylindrical outer surface of the steering jacket.

19. The method of claim 13, further including providing the at least one interface feature as a single interface feature.

20. The method of claim 19, further including providing the interface feature as a plastically deformed material of the steering jacket, with the interface feature extending radially outwardly from a generally cylindrical outer surface of the steering jacket.

* * * * *